United States Patent Office 3,576,009
Patented Apr. 20, 1971

3,576,009
AMPHETAMINE DERIVATIVES
Ernest Magnien, Flushing, and Bill Elpern, White Plains, N.Y., assignors to USV Pharmaceutical Corporation
No Drawing. Filed Apr. 2, 1968, Ser. No. 718,220
Int. Cl. C07d 5/06
U.S. Cl. 260—343.6                5 Claims

ABSTRACT OF THE DISCLOSURE

Derivatives of amphetamine obtained by the reaction of amphetamine with 2-acyllactone or a β-keto-ester or the compound obtained upon hydrogenation of the lactone reaction product are potent appetite depressants but do not show the CNS activity of amphetamine.

This invention relates to new organic compounds having valuable pharmacological activity and to processes for the preparation of said compounds. In particular the invention relates to derivatives of amphetamine and amphetamine-like compounds.

Amphetamine is a potent anorexic agent and is used as such in cases of obesity. However, in addition to its anorexic activity amphetamine also has central nervous system stimulatory activity which is undersirable when patients are treated for obesity.

It is, accordingly, an object of this invention to provide derivatives of amphetamine or amphetamine-like compounds which possess the desirable anorexic properties but show little or no central nervous system stimulation.

We have now found that derivatives of amphetamine and amphetamine-like compounds having the formula

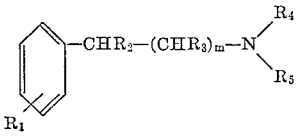

wherein $m$ is 0 or 1
$R_1$ is hydrogen, lower alkyl, halogen or lower alkoxy,
$R_2$ is hydrogen or hydroxy,
$R_3$ is hydrogen, lower alkyl or phenyl-lower alkyl,
$R_4$ is hydrogen or lower alkyl,
$R_5$ is radical of the formula $R_6O_2C$—CH=C($R_9$)—, wherein $R_6$ is lower alkyl and $R_9$ is lower alkyl, or a lactone of the fomula

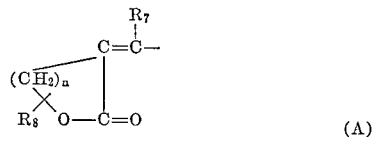

or

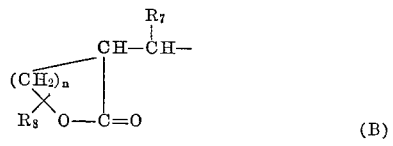

wherein $R_7$ is hydrogen, lower alkyl or phenyl, and $R_8$ is hydrogen, lower alkyl, phenyl, lower alkoxymethyl, or phenoxymethyl, and $n$ is an integer having the value of 2–4, are potent anorexic agents but have little or no central nervous system stimulating activity.

The lower alkyl groups contain from 1 to 5 carbon atoms and include such groups as methyl, ethyl, propyl, isopropyl, butyl, sec-butyl, amyl, isoamyl and the like. The lower alkoxy groups contain from 1 to 5 carbon atoms and include such groups as methoxy, ethoxy, isopropoxy, butoxy, and the like.

Preferably $n$ is 2, $m$ is 1, $R_1$ is hydrogen or methoxy, $R_2$ is hydrogen, $R_3$ is lower alkyl, $R_4$ is hydrogen, $R_6$ is ethyl, $R_7$ is methyl, $R_8$ is hydrogen, and $R_9$ is methyl.

Where $R_5$ is a lactone of structure A the compounds are prepared by contacting at ambient temperature in the presence of an inert solvent, such as benzene, toluene, hexane, chloroform, chlorobenzene and the like, an amine of the formula

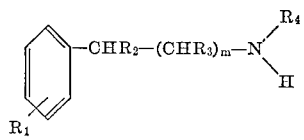

with an appropriately substituted 2-acyl-lactone of the formula

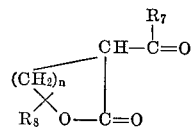

The lactone compounds of structure B are readily obtained by the hydrogenation of the double bond in the lactone of structure A.

To obtain the ring-substituted acyl-lactones, an appropriately substituted 1,2-epoxide is reacted with the sodium salt of β-keto-ester.

Where $R_5$ is the $R_6O_2CCH=C(R_9)$— group, the compound is obtained by the reaction of the amine above with a β-keto ester of the formula $$R_6O_2C-CH_2-CO-R_9$$

under conditions similar to those above.

In these processes the product is obtained in crude form upon evaporation of the inert solvent and is then purified by crystallization.

In the above formulas $R_1$ to $R_9$ have the same meaning as previously described.

The invention will be more fully understood from the examples which follow, and it is intended to cover all changes and modifications of the invention herein chosen for purposes of disclosure which do not constitute departures from the spirit and scope of the invention.

EXAMPLE 1 d-2-(2-hydroxyethyl)-3-(1-phenyl-2-propyl-amino) crotonic acid lactone

To a solution of 200 g. (1.485 mole) of d-amphetamine in 200 ml. of benzene is added 190 g. (1.485 mole) of 2-acetylbutylrolactone. After 18 hrs., the benzene solution is decanted from the separated water and dried over MgSO$_4$. The benzene is removed in vacuo and the resulting oil is crystallized from ether to yield 187 g. (51.5%) of crude product. A further crystallization from ether results in 107 g. of pure product of M.P. 64–67°.

EXAMPLE 2

(a) 2-acetyl-4-phenoxymethylbutyrolactone

To a solution of 11.5 g. (0.5 mole) of sodium in 200 ml. of dried ethanol was added at 50°, 65 g. (0.5 mole) of ethylacetoacetate. To this solution was added 75 g. (0.5 mole) of 1,2-epoxy-3-phenoxypropane. The mixture was allowed to stand for 40 hours. 30 g. (0.5 mole) of acetic acid and 100 ml. of water was added with cooling and the resulting oil was extracted into ether. Evaporation to a small volume and cooling resulted in crystals of the product of M.P. 70–73°. Recrystallization from ethyl acetate-hexane gave pure material of M.P. 72–73°.

(b) d-2-(2-hydroxy-3-phenoxypropyl)-3-(1-phenyl-2-propylamino)-crotonic acid lactone A mixture of 20 g. (0.085 mole) of 2-acetyl-4-phenoxymethylbutyrolactone and 7.7 g. (0.057 mole) of d-amphetamine in 100 ml. of benzene was allowed to stand at room temperature for 60 hours. A colorless solid appeared 10 min. after mixing, but redissolved after standing. The solution was refluxed for ½ hour and then distilled to yield 16.8 g. of material having a B.P. of 250–260°/0.2 mm. and an $n_D^{25}$ 1.5920.

EXAMPLE 3

Ethyl 3-(1-methyl-2-phenethylamino)-crotonate

A mixture of 13.5 g. of d-amphetamine and 13.0 g. of ethyl acetoacetate in 20 ml. of xylene was refluxed for 4 hours with removal of water in a Dean Stark trap. After evaporation of the xylene, the residue was distilled to yield 9.0 g. of product of B.P. 128°/0.03 mm., $n_D^{25}$ 1.5385.

EXAMPLE 4

3-(1,3-diphenyl-2-propylamino)-2-(2-hydroxyethyl) crotonic acid lactone

A solution of 15 g. of 1,3-diphenyl-2-aminopropane (prepared by LiAlH₄ reduction of the corresponding oxime) and 9.1 of 2-acetyl-butyrolactone in 20 ml. of benzene was refluxed for 4 hours with removal of water. The product was distilled after removal of the solvent to yield 20.7 g. of material of B.P. 210–215°/0.05 mm. To this material was added 20 ml. of ether and a colorless solid was filtered off. The filtrate was treated with 80 ml. of hexane and the product which precipitated was filtered off. Recrystallization from ether-hexane resulted in a product of M.P. 63–65°.

EXAMPLE 5

2-(hydroxyethyl)-3-d-(1-phenyl-2-propylamino)-butyric acid lactone

A solution of 50 g. d-2-(2-hydroxy-ethyl)-3-(-phenyl-2-propylamino) crotonic acid lactone in 250 ml. of ethanol was placed in a Paar hydrogenerator with 1 g. of platinum oxide and shaken for 24 hours at an initial pressure of 18.6 lbs./sq. in. After 24 hours, an additional 1 g. of platinum oxide was added and shaking was resumed for 11 hours. After removal of the spent catalyst the solution was evaporated and the residue was distilled to yield 35 g. of product of B.P. 162–164°/0.05 mm., $n_D^{20}$ 1.5635. The maleate salt has an M.P. of 109–112°.

Following similar procedures, the following additional compounds were prepared:

The anorexic activity and CNS activity in dogs of representative compounds are shown in Table II.

TABLE II

| No. of compound in Table V or example | E.R.D.-50 (mg. b./kg.) | Minimal CNS Stimulant Dose (mg. b./kg.) |
|---|---|---|
| Amphetamine | 0.75 | 0.5 |
| Example I | 3.7 | 5.0 |
| Example III | 5.8 | |
| 5 | 12.5 | |
| Example V | 4.0 | 5.0 |
| 10 | 4.0 | 5.0 |
| 7 | 3.0 | 10.0 |

E.R.D.-50 is the Effective Refusal Dose—dose at which one-half of the animals refuse to eat.

The compounds herein described may be administered orally in the form of tablets, capsules, elixirs, solutions, and the like. The compounds may be taken in dosages totaling from 5 to 50 mg./kg. daily.

The individual unit dosages and frequency of determination will be determined by the subject's weight, age and indulgency, physical condition, and it will be within the professional judgment of the practitioner administering the drug to determine the exact amount to be administered.

We claim:
1. A compound of the formula

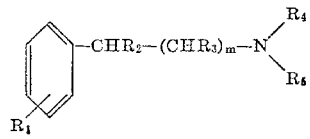

wherein $m$ is 0 or 1,
$R_1$ is hydrogen, lower alkyl, halogen, or lower alkoxy,
$R_2$ is hydrogen or hydroxy,
$R_3$ is hydrogen, lower alkyl or phenyl-lower alkyl,
$R_4$ is hydrogen or lower alkyl, and
$R_5$ is a lactone of the formula

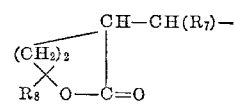

or

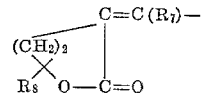

TABLE I

[$m=1$, $n=2$, $R_5=A$]

| Compound No. | $R_1$ | $R_2$ | $R_3$ | $R_4$ | $R_7$ | $R_8$ | M.P. or B.P. |
|---|---|---|---|---|---|---|---|
| 1 | H | H | H | H | CH₃ (dl) | CH₃ | 83–84°. |
| 2 | H | H | H | H | H | CH₃ | 80–83°. |
| 3 | p-Cl | H | H | H | CH₃ | CH₃ | 83–85°. |
| 4 | p-F | H | H | H | CH₃ | CH₃ | (170°/0.05 mm.). |
| 5 | p-OCH₃ | H | H | H | CH₃ | CH₃ | 87–88°. |
| 6 | m-CF₃ | H | H | H | CH₃ | CH₃ | 85–87°. |
| 7 | H | OH | H | H | CH₃ | CH₃ | 186–188°. |
| 8 | H | H | H | H | CH₃ | C₃H₇ | (172°/0.08 mm.). |
| 9 | H | H | H | H | CH₃ | C₆H₅ | 103–104°. |
| 10 | H | H | H | H | CH₃ | CH₃ | (160–166°/0.02 mm.). |
| 11 | H | H | H | H | CH₃ | C₆H₅ | (236–242°/0.2 mm.). |
| 12 | H | H | C₂H₅ | C₂H₅ | CH₃ | CH₃ | (168°/0.07 mm.). |
| 13 | H | H | H | H | CH₃ | CH₃ | (200°/0.3 mm.). |
| 14 | p-CH₃ | H | H | H | CH₃ | CH₃ | (176–178°/0.2 mm.). |
| 15 | o-OCH₃ | H | H | H | CH₃ | CH₃ | 78–79°. | wherein

R₇ is hydrogen, lower alkyl or phenyl, and
R₈ is hydrogen, lower alkyl, phenyl, lower alkoxymethyl, or phenoxymethyl.

2. A compound according to claim 1, wherein
m is 1,
R₁ is hydrogen,
R₂ is hydroxy,
R₃ is methyl,
R₄ is hydrogen, and
R₅ is of the structure

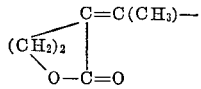

3. A compound according to claim 1, wherein
m is 1,
R₁ is hydrogen,
R₂ is hydrogen,
R₃ is methyl,
R₄ is hydrogen, and
R₅ is of the structure

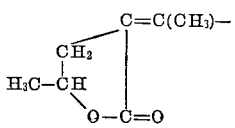

4. A compound according to claim 1, wherein
m is 1,
R₁ is hydrogen,
R₂ is hydrogen,
R₃ is methyl,
R₄ is hydrogen, and
R₅ is of the structure

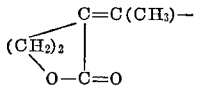

5. A compound according to claim 1 wherein
m is 1,
R₁ is hydrogen,
R₂ is hydrogen,
R₃ is methyl,
R₄ is hydrogen, and
R₅ is of the structure

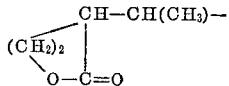

References Cited

UNITED STATES PATENTS 3,274,248   9/1966   Harsányi et al. _____ 260—343.6

ALEX MAZEL, Primary Examiner

A. M. T. TIGHE, Assistant Examiner

U.S. Cl. X.R.

260—343.5, 343, 471; 424—279, 309